United States Patent
Park et al.

(10) Patent No.: US 11,057,169 B2
(45) Date of Patent: *Jul. 6, 2021

(54) METHOD FOR TRANSMITTING AND RECEIVING SIGNAL IN A WIRELESS LOCAL AREA NETWORK AND DEVICE FOR SAME

(71) Applicant: LG ELECTRONICS INC., Seoul (KR)

(72) Inventors: Sungjin Park, Seoul (KR); Jinmin Kim, Seoul (KR); Kyungtae Jo, Seoul (KR); Hangyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,309

(22) Filed: May 18, 2020

(65) Prior Publication Data

US 2020/0280402 A1    Sep. 3, 2020

Related U.S. Application Data

(63) Continuation of application No. 15/699,224, filed on Sep. 8, 2017, now Pat. No. 10,693,603.

(60) Provisional application No. 62/384,770, filed on Sep. 8, 2016, provisional application No. 62/393,685, filed on Sep. 13, 2016, provisional application No. 62/404,220, filed on Oct. 5, 2016.

(51) Int. Cl.
*H04L 5/00* (2006.01)
*H04B 7/06* (2006.01)
*H04B 7/08* (2006.01)
*H04W 84/12* (2009.01)
*H04W 16/28* (2009.01)

(52) U.S. Cl.
CPC .......... *H04L 5/001* (2013.01); *H04B 7/0617* (2013.01); *H04B 7/0695* (2013.01); *H04B 7/088* (2013.01); *H04W 16/28* (2013.01); *H04W 84/12* (2013.01)

(58) Field of Classification Search
CPC .... H04B 7/0617; H04B 7/0695; H04B 7/088; H04L 5/0007; H04L 5/001; H04L 5/0053; H04W 16/28; H04W 84/12
See application file for complete search history.

(56) References Cited

U.S. PATENT DOCUMENTS

| | | | |
|---|---|---|---|
| 2015/0244432 A1* | 8/2015 | Wang | H04B 7/0695 375/267 |
| 2016/0323755 A1* | 11/2016 | Cordeiro | H04J 13/0014 |
| 2017/0078008 A1* | 3/2017 | Kasher | H04B 7/0617 |
| 2017/0317726 A1* | 11/2017 | Abdallah | H04B 17/318 |
| 2018/0006705 A1* | 1/2018 | Cariou | H04L 69/28 |
| 2019/0068271 A1* | 2/2019 | Lou | H04B 17/12 |

* cited by examiner

*Primary Examiner* — Jaime M Holliday
(74) *Attorney, Agent, or Firm* — Dentons US LLP

(57) ABSTRACT

The present specification proposes a method for a station to transmit and receive a signal in a wireless LAN (WLAN) system and an apparatus therefor. More specifically, when the station transmits and receives a signal via a plurality of channels, the present invention proposes a method of performing beamforming training on the plurality of channels, a method of transmitting and receiving a signal based on the beamforming training and an apparatus therefor.

16 Claims, 20 Drawing Sheets

| CH 1 | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: legacy, GF: gap filling, ay: 802.11ay)

FIG. 17

| CH1 | L-STF | L-CE | L-Header | Payload (BRP frame) |

FIG. 18

| CH1 | L-STF | L-CE | L-Header | EDMG Header A | Payload (BRP frame) |

FIG. 22

| CH1 | L-STF | L-CE | L-Header | EDMG Header A | EDMG STF | EDMG CE | Payload (BRP frame) | AGC | TRN | TRN | TRN |
| CH2 | L-STF | L-CE | L-Header | EDMG Header A | | | | | | | |

TX sector S1, TX sector S2, TX sector S3

RX sectors, RX sectors, RX sectors

FIG. 23

| CH1 | L-STF | L-CE | L-Header | EDMG Header A | Payload (BRP frame) | AGC | TRN |

| CH2 | L-STF | L-CE | L-Header | EDMG Header A | Payload (BRP frame) | AGC | TRN |

METHOD FOR TRANSMITTING AND RECEIVING SIGNAL IN A WIRELESS LOCAL AREA NETWORK AND DEVICE FOR SAME

This application is a continuation of U.S. patent application Ser. No. 15/699,224, filed Sep. 8, 2017, which claims the benefit of U.S. Provisional Application Nos. 62/404,220, filed Oct. 5, 2016, 62/393,685, filed Sep. 13, 2016, and 62/384,770, filed Sep. 8, 2016, all of which are incorporated by reference in their entirety herein.

BACKGROUND OF THE INVENTION

Field of the Invention

Following description relates to a method of transmitting and receiving a signal of a station in a wireless LAN (WLAN) system. More particularly, when a station transmits and receives a signal through a plurality of channels, the present invention relates to a method of performing beamforming training on the plurality of channels, a method of transmitting and receiving a signal based on the beamforming training, and an apparatus therefor.

Discussion of the Related Art

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Meanwhile, IEEE 802.11ad defines performance enhancement for high-speed throughput in the 60 GHz band, and IEEE 802.11ay, for introducing channel bonding and MIMO technology to IEEE 802.11ad systems for the first time, is being discussed.

SUMMARY OF THE INVENTION

A station can transmit and receive a signal through a plurality of channels in 11ay system to which the present invention is applicable.

The present invention proposes a method of performing beamforming training on the plurality of channels, a method of transmitting and receiving a signal based on the beamforming training, and an apparatus therefor.

To achieve these objects and other advantages and in accordance with the purpose of the invention, as embodied and broadly described herein, according to one embodiment, a method of transmitting a signal, which is transmitted by a first station (STA) to a second STA through a plurality of channels in a wireless LAN (WLAN) system, includes the steps of transmitting a BRP (beam refinement protocol) packet to the second STA by applying a lowest MCS (modulation and coding scheme) to the BRP packet to perform beamforming training on the plurality of channels with the second STA, and transmitting a signal to the second STA through the plurality of channels based on a result of the beamforming training.

To further achieve these objects and other advantages and in accordance with the purpose of the invention, as embodied and broadly described herein, according to a different embodiment, a method of receiving a signal, which is received by a first station (STA) from a second STA through a plurality of channels in a wireless LAN (WLAN) system, includes the steps of receiving a BRP (beam refinement protocol) packet from the second STA by applying a lowest MCS (modulation and coding scheme) to the BRP packet to perform beamforming training on the plurality of channels with the second STA, and receiving a signal from the second STA through the plurality of channels based on a result of the beamforming training.

To further achieve these objects and other advantages and in accordance with the purpose of the invention, as embodied and broadly described herein, according to a further different embodiment, a station transmitting a signal via a plurality of channels in a wireless LAN (WLAN) system includes a transceiver having one or more RF (radio frequency) chains configured to transceive a signal with a different station, and a processor configured to process a signal transceived with the different station in a manner of being connected with the transceiver, the processor configured to transmit a BRP (beam refinement protocol) packet to the different station by applying a lowest MCS (modulation and coding scheme) to the BRP packet to perform beamforming training on the plurality of channels with the different station, the processor configured to transmit a signal to the different station through the plurality of channels based on a result of the beamforming training.

To further achieve these objects and other advantages and in accordance with the purpose of the invention, as embodied and broadly described herein, according to a further different embodiment, a station receiving a signal via a plurality of channels in a wireless LAN (WLAN) system includes a transceiver having one or more RF (radio frequency) chains configured to transceive a signal with a different station, and a processor configured to process a signal transceived with the different station in a manner of being connected with the transceiver, the processor configured to receive a BRP (beam refinement protocol) packet from the different station by applying a lowest MCS (modulation and coding scheme) to the BRP packet to perform beamforming training on the plurality of channels with the different station, the processor configured to receive a signal from the different station through the plurality of channels based on a result of the beamforming training.

In this case, the BRP packet can be configured in an order of an L-STF (Legacy Shot Training Field) Field, an L-CE (Legacy Channel Estimation) field, an L-Header (Legacy Header) field, an EDMG Header A (Enhanced Directional Multi Gigabit Header A) field and a BRP (Beam Refinement Protocol) frame, and a TRN (Training) field.

For example, when the signal transmission method through the plurality of channels corresponds to channel bonding, the channel bonding can include channel bonding of 2 to 4 channels.

As a different example, when the signal transmission method through the plurality of channels corresponds to channel aggregation, the channel aggregation can include channel aggregation of 2 channels or channel aggregation of 4 channels.

In this case, the BRP packet may not include an EDMG-STF field, an EDMG-CE field, and an EDMG header-B field.

And, the EDMG Header A field is transmitted in a manner of being duplicated via each channel included in the plurality of channels and the TRN field can be transmitted using a channel bonding transmission scheme or a channel aggregation transmission scheme according to information indicated by the Header A field.

Effects obtainable from the present invention are non-limited by the above mentioned effect. And, other unmentioned effects can be clearly understood from the following description by those having ordinary skill in the technical field to which the present invention pertains.

In the present invention, an MCS level 0 can be applied as the lowest MCS.

A station according to the present invention performs beamforming training on a plurality of channels and can more reliably transmit/receive a signal based on the beamforming training through the aforementioned configuration.

The effects that may be obtained by the present invention are not limited to the above-mentioned effects, and other effects not mentioned above will be clearly understood by those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 17 and 18 are diagrams illustrating a PPDU format transmitted in a BRP setup subphase according to a different example applicable to the present invention;

FIGS. 21 to 23 are diagrams illustrating a PPDU format transmitted in a BRP transaction subphase according to an example applicable to the present invention;

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

1. Wireless LAN (WLAN) System 1-1. Generals of WLAN System

Figure 1:
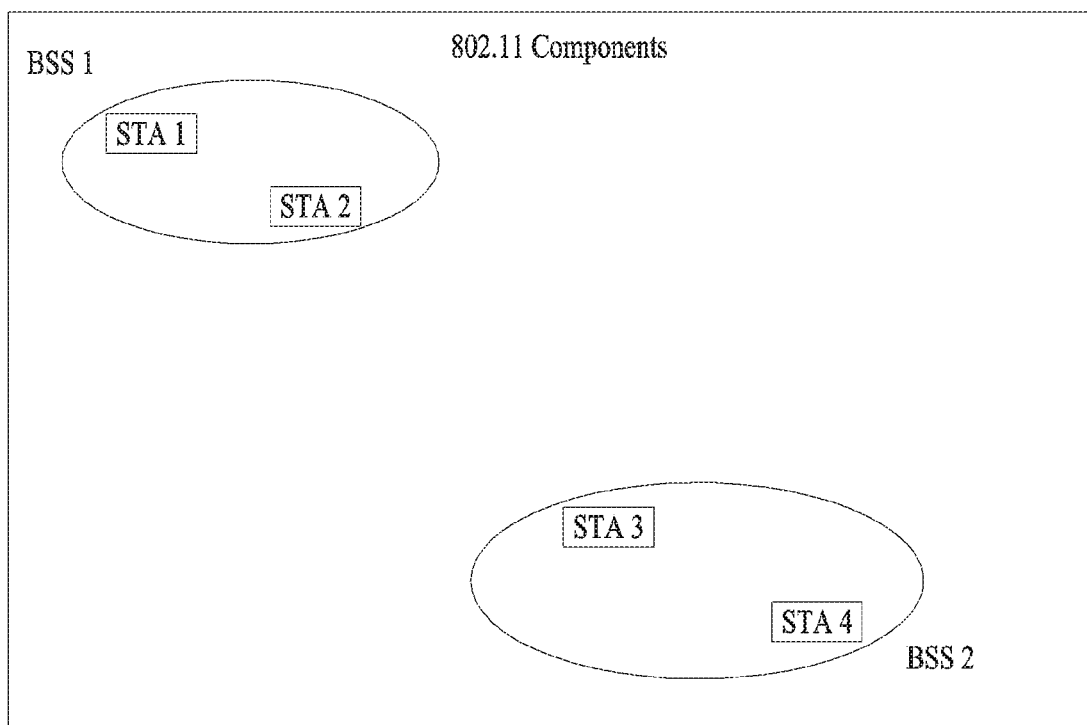
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
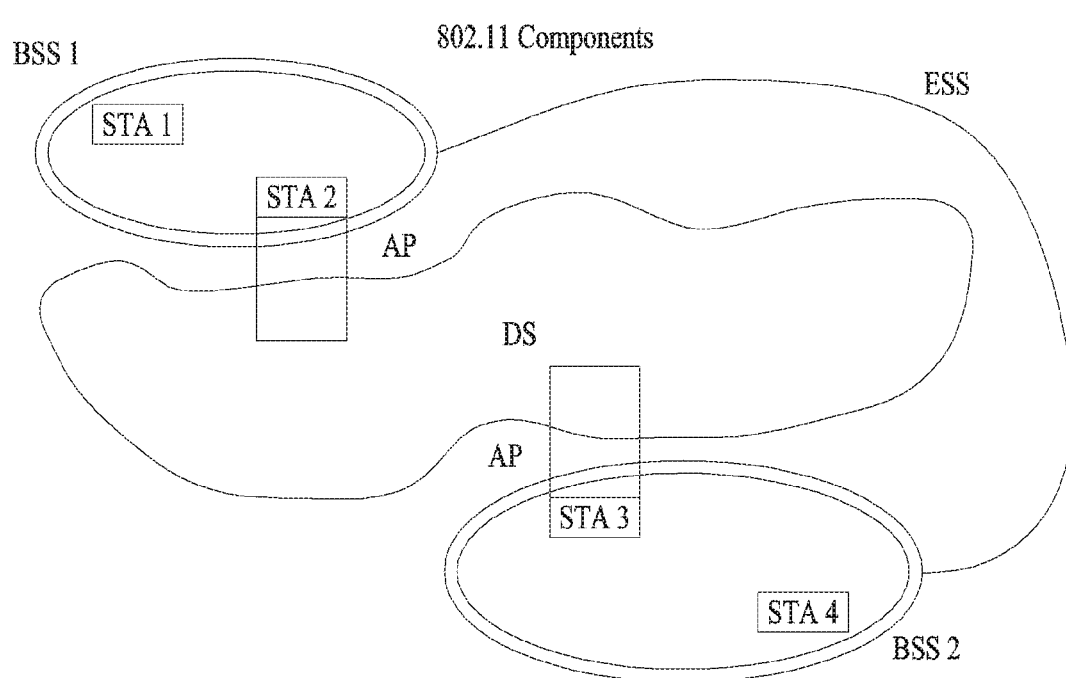
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1-2 Channel Bonding in WLAN System

Figure 3:
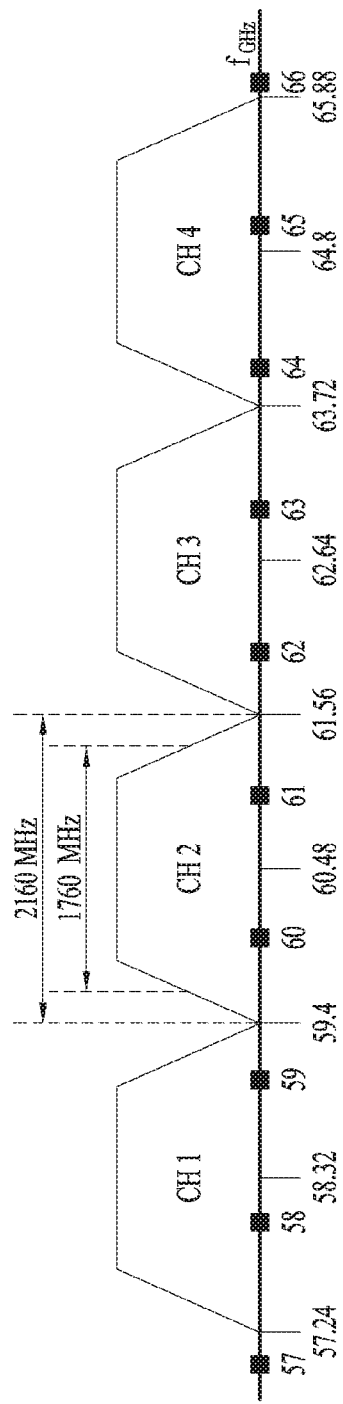
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the present invention is not limited to a specific channel.

Figure 4:
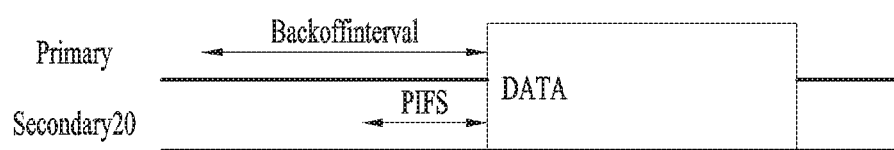
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

1-3. Beacon Interval Configuration

Figure 5:
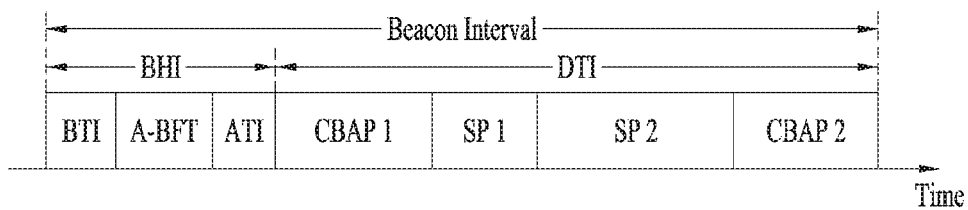
FIG. 5 is a diagram illustrating configuration of a beacon interval.

FIG. 5 is a diagram illustrating configuration of a beacon interval.

In had-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 4.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

1-4. Physical Layer Configuration

It is assumed that the following three different modulation modes may be provided in the WLAN system according to an embodiment of the present invention.

TABLE 1

| PHY | MCS | Note |
| --- | --- | --- |
| Control PHY | 0 | |
| Single carrier PHY (SC PHY) | 1 . . . 12 25 . . . 31 | (low power SC PHY) |
| OFDM PHY | 13 . . . 24 | |

Such modulation modes may be used to satisfy different requirements (e.g., high throughput or stability). Depending on the system, only some of these modes may be supported.

Figure 6:
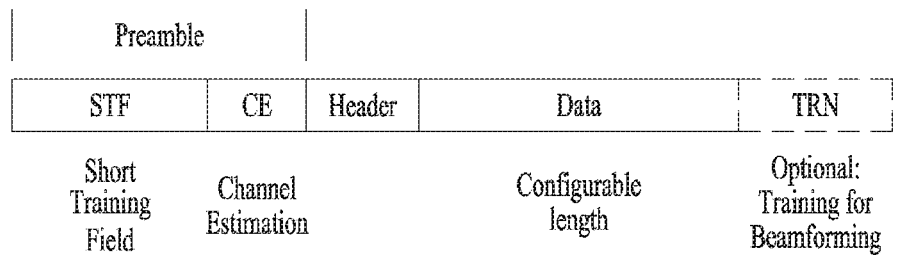
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
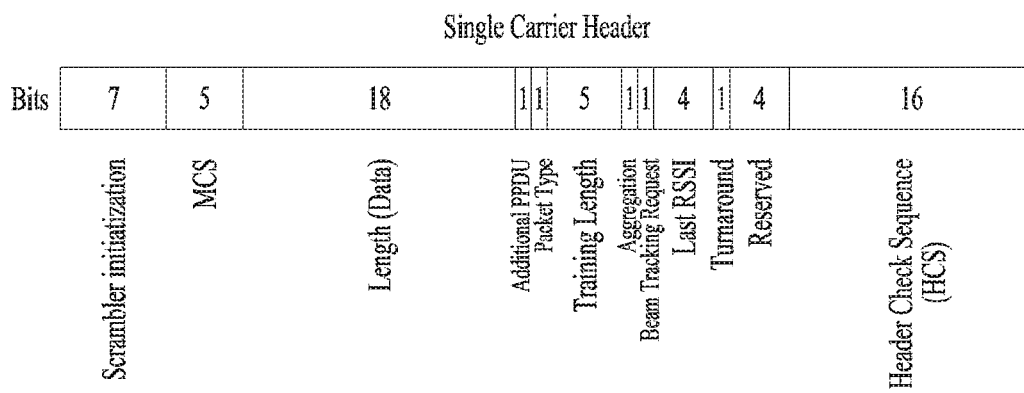
FIGS. 7 and 8 are diagrams illustrating configuration of the header field of the radio frame of FIG. 6.
Figures 8, 9:
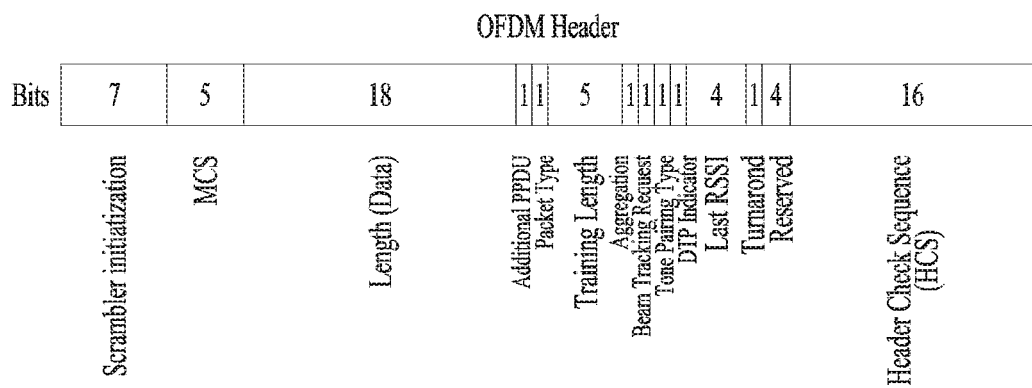
FIG. 9 is a diagram showing a PPDU structure applicable to the present invention.

FIGS. 7 and 8 are diagrams illustrating configuration of the header field of the radio frame of FIG. 6.

Specifically, FIG. 7 illustrates a case where an Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam training request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam training request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11 ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for a 11ay UE following a legacy header field may be defined, and channel bonding and MIMO may be supported through the newly defined field.

FIG. 9 is a diagram showing a PPDU structure according to a preferred embodiment of the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, transmitting the new STF and CE field (gap filling) preamble through the 400 MHz band between the channels along with transmission of the legacy preamble may be considered.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or "ay header" and "EDMG header" may be interchangeably used.

For example, a total of six or eight channels (2.16 GHz) may be present in 11ay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B are transmitted in a wideband after the legacy preamble, legacy header, and ay header A, without the GF-STF and GF-CE field indicated by the dotted line in FIG. 9.

Figure 10:
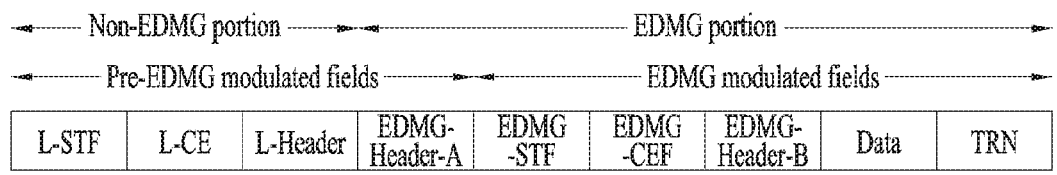
FIG. 10 is a diagram simply illustrating a PPDU structure applicable to the present invention.

FIG. 10 is a diagram simply illustrating a PPDU structure applicable to the present invention. The aforementioned PPDU format can be summarized as FIG. 10.

As shown in FIG. 10, a PPDU format applicable to 11ay system can include such a field as L-STF, L-CE, L-Header, EDMG-Header-A, EDMG-STF, EDMG-CEF, EDMG-Header-B, Data, and TRN field. The above fields can be selectively included according to a form (e.g., SU PPDU, MU PPDU, etc.) of a PPDU.

In this case, a portion including the L-STF, the L-CE, and the L-header fields can be referred to as a non-EDMG portion and the remaining portion can be referred to as an EDMG portion. And, the L-STF, the L-CE, the L-Header, and the EDMG-Header-A fields can be referred to as pre-EDMG modulated fields and the remaining portion can be referred to as an EDMG modulated field.

3. Beamforming Procedure Applicable to the Present Invention

As mentioned in the foregoing description, in 11ay system to which the present invention is applicable, such a method of transmitting data using a plurality of channels at the same time as channel bonding, channel aggregation, FDMA, etc. can be applied. In particular, since the 11ay system to which the present invention is applicable utilizes a signal of a high frequency band, it may apply a beamforming operation to reliably transmit and receive a signal.

However, in a legacy 11ad system, a beamforming method is defined for a single channel only and a beamforming method capable of being applied to a plurality of channels is not defined yet. Hence, the present invention explains a beamforming procedure for performing channel bonding or channel aggregation transmission using a plurality of channels (e.g., full bandwidth to be used for channel bonding or channel aggregation) in detail, in order to achieve the maximum benefits of channel bonding or channel aggregation transmission.

In order to explain the beamforming procedure applicable to the present invention, a beamforming procedure for a single channel is basically explained in detail.

Figure 11:
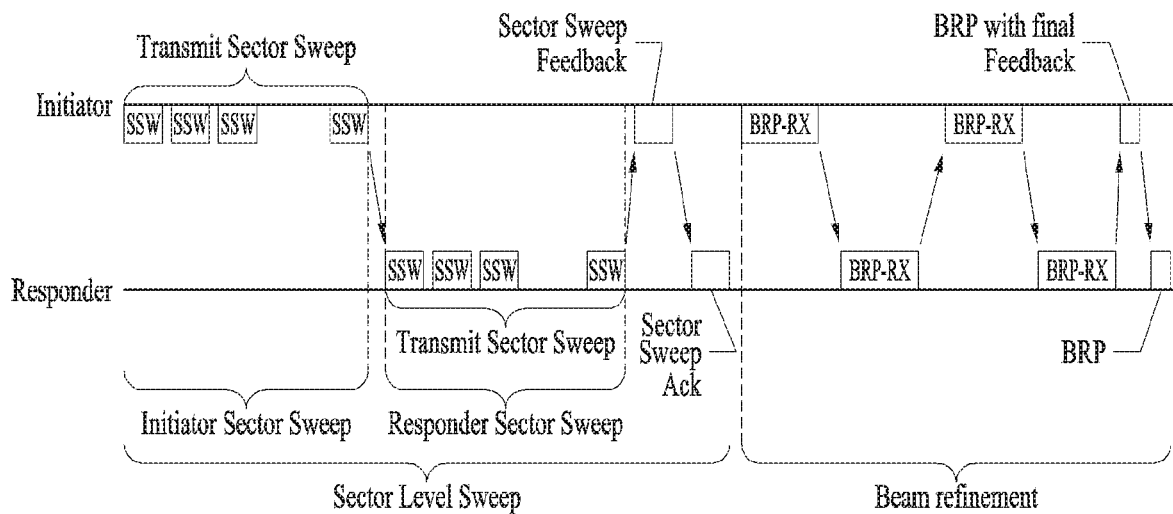
FIG. 11 is a diagram for an example of a beamforming training procedure applicable to the present invention.

FIG. 11 is a diagram for an example of a beamforming training procedure applicable to the present invention.

Basically, a beamforming procedure applicable to the present invention can be mainly divided into an SLS (sector level sweep) phase and a BRP (beam refinement protocol or beam refinement phase) phase. In this case, the BRP phase can be optionally performed.

In the following, an STA intending to transmit data via a beamforming operation is referred to as an initiator and an STA receiving data from the initiator is referred to as a responder.

For BF training that occurs within the A-BFT allocation, the AP or PCP/AP is the initiator and a non-AP and non-PCP STA becomes the responder. For BF training that occurs during an SP allocation, the source (EDMG) STA of the SP is the initiator and the destination STA of the SP becomes the responder. For BF training during a TXOP allocation, the TXOP holder is the initiator and the TXOP responder is the responder.

The link from the initiator to the responder is referred to as the initiator link and the link from the responder to the initiator is referred to as the responder link.

In order to more reliably transmit data, control information, and the like on 60 GHz band supported by the 11ay system to which the present invention is applicable, it may apply a directional transmission scheme rather than an omni transmission scheme.

To this end, STAs intending to transceive data are able to become aware of TX or RX best sector for an initiator and a responder through the SLS procedure.

BF training starts with a SLS (sector level sweep) from the initiator. The purpose of the SLS phase is to enable communications between the two participating STAs at the control PHY rate or higher MCS. Normally, the SLS phase provides only transmit BF training.

Additionally, if there is a request from the initiator or the responder, a BRP (beam refinement protocol or beam refinement phase) can be performed right after the SLS.

The purpose of the BRP phase is to enable receive training and enable iterative refinement of the AWV (antenna weight vector) of both transmitter and receiver at both participating STAs. If one of the participating STAs chooses to use only one transmit antenna pattern, receive training may be performed as part of the SLS.

The SLS phase is explained in more detail. The SLS phase can include 4 elements described in the following: ISS (initiator sector sweep) for training the initiator link, RSS (responder sector sweep) for training the responder link, SSW feedback, and SSW ACK.

The initiator starts the SLS phase by transmitting frame(s) of the ISS.

The responder does not start to transmit frame(s) of the RSS before the ISS is successfully completed except a case that the ISS occurs within the BTI.

The initiator does not start the SSW feedback before the RSS phase is successfully completed except a case that the RSS occurs within the A-BFT. The responder does not start the SSW ACK of the initiator within the A-BFT.

The responder starts the SSW ACK of the initiator immediately after the SSW feedback of the initiator is successfully completed.

BF frames transmitted by the initiator during the SLS phase can include an (EDMG) beacon frame, an SSW frame, and an SSW feedback frame. BF frames transmitted by the responder during the SLS phase can include an SSW frame and an SSW-ACK frame.

If each of the initiator and the responder executes TXSS (transmit sector sweep) during the SLS phase, the initiator and the responder possess a transmit sector of its own at the end of the SLS phase. If the ISS or the RSS employees receive sector sweep, each of the initiator and the responder possesses a receive sector of its own.

An STA shall not change its transmit power during a sector sweep.

Figure 12:
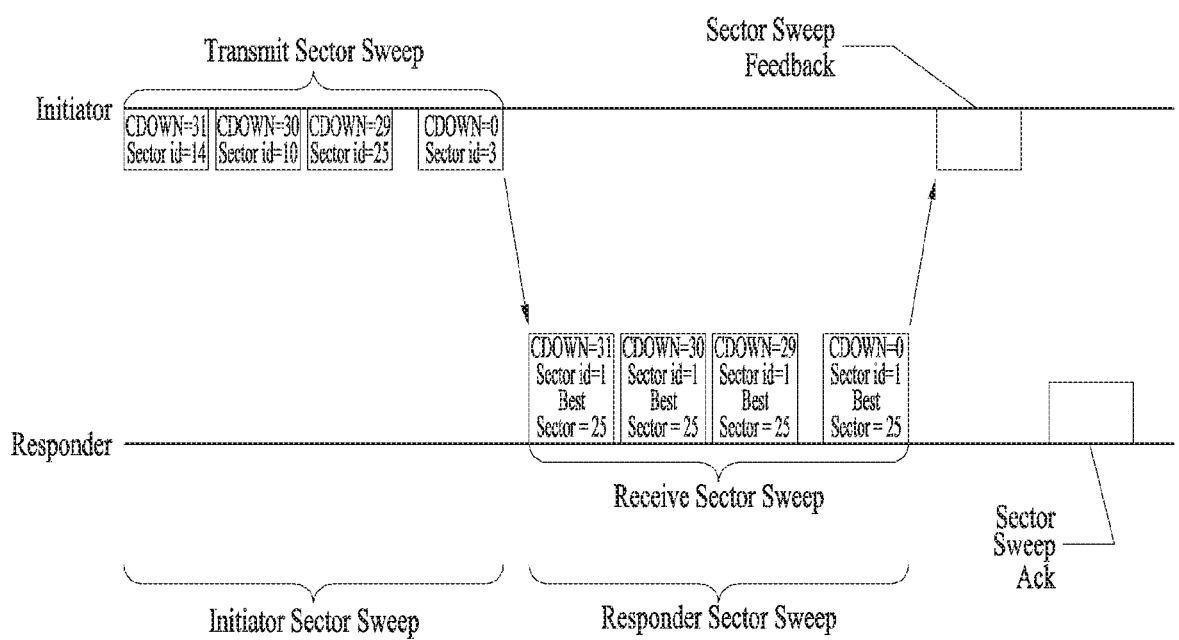
FIGS. 12 and 13 are diagrams for examples of an SLS (sector level sweep) phase.
Figure 13:
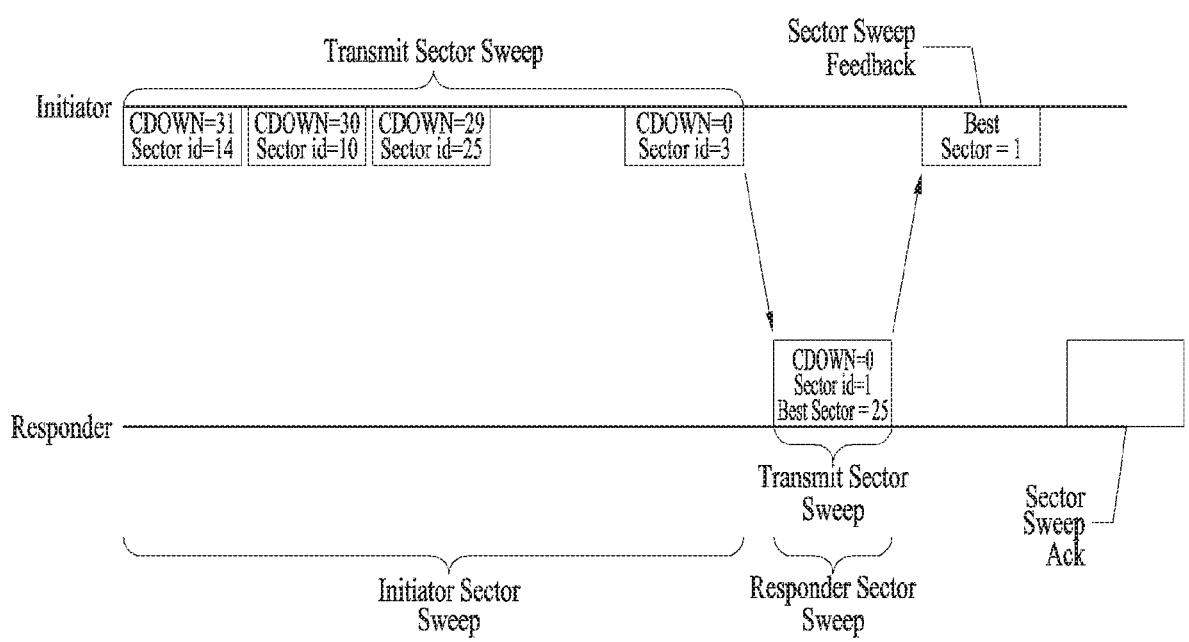

FIGS. 12 and 13 are diagrams for examples of an SLS (sector level sweep) phase

Referring to FIG. 12, the initiator has many sectors and the responder has only one transmit sector and receive sector used at the RSS. The responder transmits all responder SSW frames through the same transmit sector and the initiator switches receive antennas at the same time.

Referring to FIG. 13, the initiator has many sectors and the responder has one transmit sector. In this case, receive training for the initiator is performed in the BRP phase.

The SLS can be summarized as follows.

The SLS corresponds to a protocol performing link detection in 802.11ay system to which the present invention is applicable. The SLS corresponds to a beam training scheme that network nodes continuously transmit and receive frames including the same information while changing a beam direction only and select a beam direction of which an indicator (e.g., SNR (signal to ratio), RSSI (received signal strength indicator), etc.) indicating performance of a channel link is the best among the successfully received frames.

The BRP can be summarized as follows.

The BRP corresponds to a protocol delicately controlling a beam direction capable of maximizing a data transfer rate of a beam direction determined by a different means. The BRP can be performed if necessary. The BRP performs beam training using a BRP frame including beam training information defined for the BRP protocol and information for reporting a training result. For example, the BRP corresponds to a beam training scheme that BRP frames are transmitted and received using a beam determined by previous beam training and beam training is practically performed using a beam training sequence included in the last part of a successfully transmitted and received BRP frame. The SLS uses a frame itself for beam training, whereas the BRP uses a beam training sequence only.

The SLS phase can be performed within BHI (beacon header interval) and/or DTI (data transfer interval).

First of all, the SLS phase performed during the BHI may be identical to the SLS phase defined in 11ad system for coexistence with 11ad system.

The SLS phase performed during the DTI can be performed when beamforming is not performed between an initiator and a responder or a beamforming link (BF link) is lost. In this case, if the initiator and the responder correspond to 11at STAs, the initiator and the responder can transmit a short SSW frame rather than an SSW frame for the SLS phase.

In this case, the short SSW frame can be defined by a frame including a short SSW packet within a data field of DMG control PHY or DMG control mode PPDU. In this case, a detail format of the short SSW packet can be differently configured depending on the usage (e.g., I-TXSS, R-TXSS, etc.) of transmitting the short SSW packet.

In particular, the SLS phase of the beamforming training procedure according to the present invention may correspond to a beamforming procedure performed on a primary channel of a system. An STA can perform the beamforming on the primary channel via the SLS phase using such a technique as channel bonding, channel aggregation, FDMA (Frequency Division Multiple Access), SU-MIMO (single User-Multiple Input Multiple Output), and MU-MIMO (Multi User-Multiple Input Multiple Output). The SLS phase can support both a legacy STA and an flay STA.

Subsequently, an STE (e.g., initiator) can perform beamforming training via the BRP phase described in the following. More specifically, the initiator can perform the BRP phase described in the following as a beamforming procedure for transmitting a signal according to channel bonding, channel aggregation, SU-MIMO, and MU-MIMO.

Figure 14:
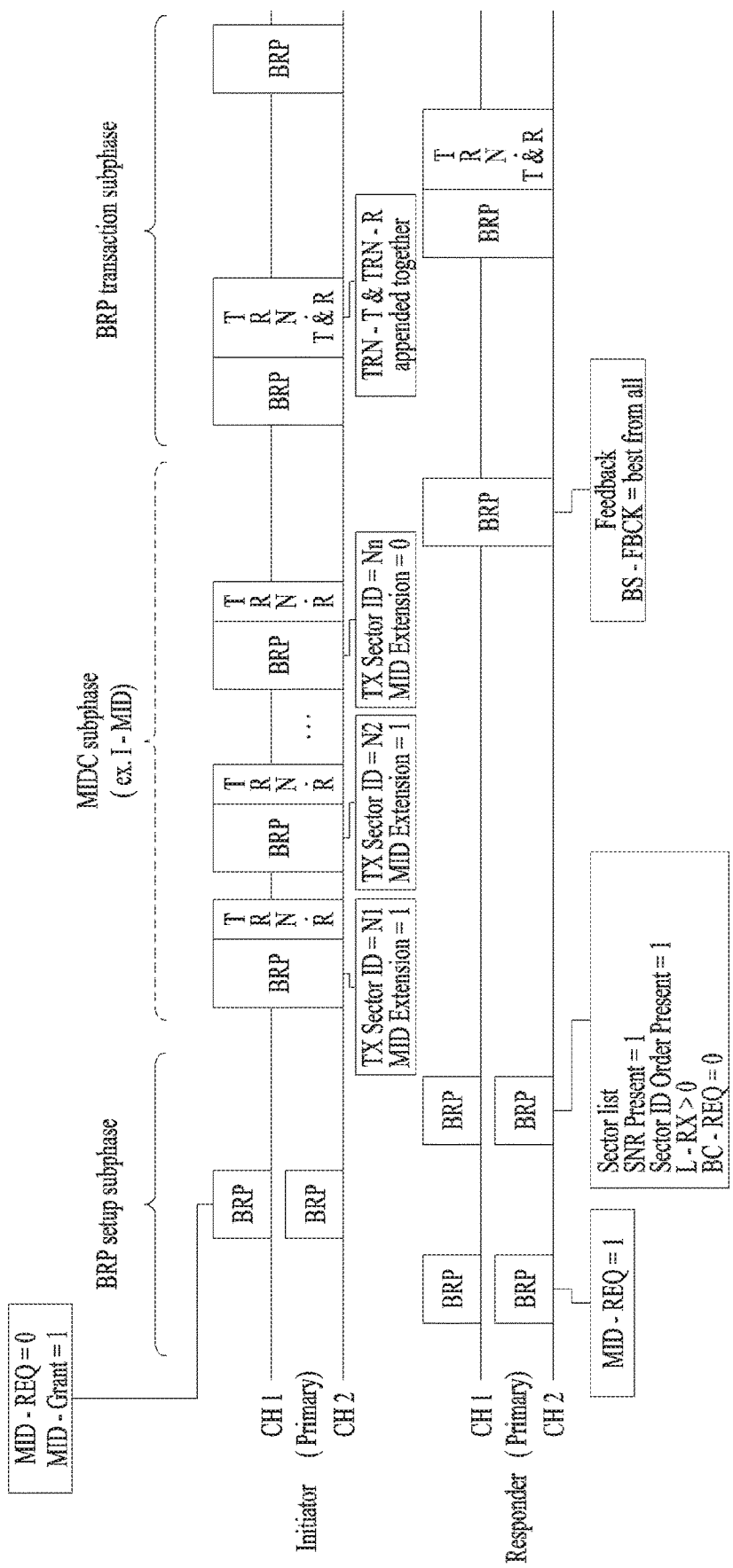
FIG. 14 is a diagram simply illustrating operations of an initiator and a responder according to a BRP phase applicable to the present invention.

FIG. 14 is a diagram simply illustrating operations of an initiator and a responder according to a BRP phase applicable to the present invention. In the following, a beamforming training operation applicable to the present invention is explained in detail with reference to FIG. 14. In this case, each phase can be independently omitted. For clarity, although a beam forming training procedure performed on two channels is disclosed in the drawing, the present invention can be extensively applied to a beamforming training procedure performed on more channels. In the following description, although a PPDU format including one AGC field and one or more TRN fields is explained as a PPDU format capable of being used according to each phase, the AGC field can be omitted and the number of the TRN fields can be variably configured.

3.1.1 BRP Setup Subphase

An initiator and a responder perform available bandwidth negotiation using RTS/CTS before signal transmission such as channel bonding, channel aggregation, and the like is performed via the BRP setup subphase. In this case, the initiator and/or the responder can transmit/receive information on multiple channels through a single channel. In this case, the information can be transmitted via control PHY where MCS corresponds to 0.

As mentioned in the foregoing description, the initiator and the responder can obtain a control PHY link via a previous SLS phase. Yet, since the previous SLS phase obtains a best sector ID only for a primary channel of a system, the initiator and the responder can transmit a BRP frame (or a BRP packet) using the best sector ID for the primary channel according to a plurality of channels on which a signal is transmitted and received. In other word, the initiator and the responder can transmit a BRP frame on a different channel (e.g., CH2) based on the best sector ID for the primary channel.

The initiator may request I-MID (initiator-multiple sector ID detection) or I-BC (initiator-beam combining) only through the BRP setup subphase.

Or, the responder may request R-MID (responder-multiple sector ID detection) or R-BC (responder-beam combining) only through the BRP setup subphase irrespective of the operation of the initiator.

In this case, the BRP frame can further include bandwidth (BW) or channel (CH) indication information as information for performing bandwidth negotiation on channels capable of being used for wideband beamforming training.

More specifically, it is necessary for the initiator and the responder to know channels to be used by the initiator and the responder and available channels before the wideband BF training is performed. For example, the initiator and the responder can perform BW/CH negotiation via an RTS (ready to send)/CTS (clear to send) frame. In this case, the BW/CH negotiation via the RTS/CTS can be selectively applied.

In this case, the BW negotiation can be performed by transmitting and receiving a BRP frame in a BRP setup subphase without preferentially performing the BW/CH negotiation via the RTS/CTS using methods described in the following.

(1) The initiator and the responder can negotiate BW information via reserved bits of the BRP frame or an element newly defined in the BRP frame.

(2) The initiator and the responder can negotiate BW information via an L-header field of a PPDU format. Specifically, the initiator and the responder can negotiate BW information using a 'scrambler initialization' field of the L-header field of the PPDU format transmitted and received in the BRP setup subphase.

(3) The initiator and the responder can negotiate BW information by adding a control trailer to a PPDU format.

The control trailer can perform a function identical to BW negotiation signaling of a control trailer used for transmitting RTS/DMG CTS. For example, although a BRP frame corresponds to a management frame, the BRP frame can be transmitted via control PHY where MCS corresponds to 0. In this case, it may be able to perform signaling identical to control trailer of RTS/DMG CTS by attaching a control trailer to the PPDU format.

(4) The initiator and the responder can negotiate BW information using EDMG header-A included in a PPDU format.

(5) If it is unable to support the abovementioned mentioned methods, the initiator and the responder can perform BW negotiation by transmitting and receiving RTS/DMG CTS frame before a BRP frame is transmitted. The initiator and the responder can transmit the BRP frame in a duplicated mode via available channels according to a result of the BW negotiation performed via the RTS/DMG CTS frame.

The BW information indicated by the aforementioned methods corresponds to a BW indicating channels capable of performing signal transmission rather than a BW corresponding to an actually transmitted PPDU format.

The abovementioned methods including the methods (1) to (4) and the method (5) can be supported at the same time.

If beamforming is performed using a short SSW frame rather than a normal SSW frame in the SLS phase which is performed prior to the BRP phase, the BRP frame can be changed as follows. This is because the short SSW frame includes a CDOWN (countdown) field and an RF (radio frequency) chain ID field instead of a legacy sector ID field and an antenna ID field.

A BRP frame applicable to the present invention can include a CDOWN field and an RF chain ID field instead of a TX-sector field by modifying a legacy BRP frame.

A BRP frame applicable to the present invention can include a CDOWN field and an RF chain ID field by adding a new element to a legacy BRP frame.

A BRP frame applicable to the present invention can be newly defined. In this case, the newly defined BRP frame can be referred to as an EDMG BRP frame. The EDMG BRP frame can include a CDOWN field and an RF chain ID field instead of a TX-sector field.

A BRP frame applicable to the present invention can be used for feedback of response. In this case, the BRP frame can include a plurality of sector IDs and antenna IDs as information transmitted to an STA, which has requested the feedback or response. In this case, the BRP frame can include a CDOWN field and an RF chain ID field instead of a sector ID field and an antenna ID field.

The initiator and the responder can negotiate a signal transmission method via the BRP setup subphase. More specifically, the initiator and the responder can negotiate whether to transmit SU-MIMO (Single User-Multiple Input Multiple Output), MU-MIMO (Multi User-Multiple Input Multiple Output), channel bonding, and channel aggregation by transmitting and receiving a BRP frame during the BRP setup subphase.

In order for the initiator and the responder to negotiate whether to perform SU-MIMO and MU-MIMO, the BRP frame can be newly defined as follows.

A BRP frame applicable to the present invention can include antenna, RF chain, TX AWV (Attribute Weight Vector), RX AWV, set of AWV, and the like by modifying a part of a legacy BRP frame.

A BRP frame applicable to the present invention can include antenna, RF chain, TX AWV, RX AWV, set of AWV, and the like by adding a new element to a legacy BRP frame.

A BRP frame applicable to the present invention can be newly defined as a BRP frame including RF chain, TX AWV, RX AWV, set of AWV, and the like.

In particular, according to the present invention, a PPDU format used in the BRP setup subphase can support a legacy system using a legacy format and can be transmitted in a control PHY mode. Hence, the PPDU format has a merit in that it is able to perform robust transmission.

Figure 15:
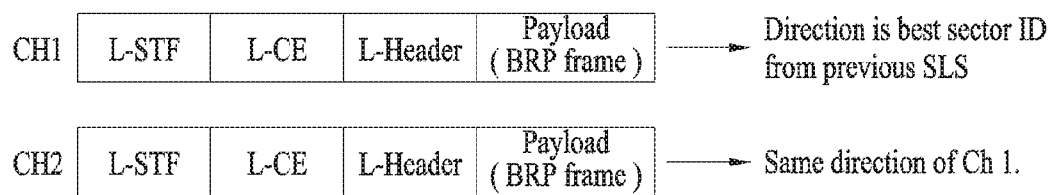
FIGS. 15 and 16 are diagrams illustrating a PPDU format transmitted in a BRP setup subphase according to an example applicable to the present invention.
Figure 16:
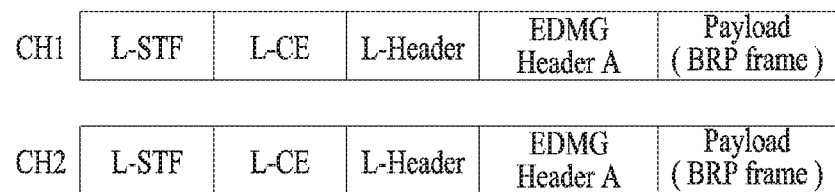

FIGS. 15 and 16 are diagrams illustrating a PPDU format transmitted in a BRP setup subphase according to an example applicable to the present invention.

As show in FIGS. 15 and 16, the PPDU format transmitted in the BRP setup subphase is transmitted in a manner of being divided according to a channel. A PPDU configuration transmitted on a channel rather than a primary channel can be transmitted in a direction identical to a direction of a PPDU configuration transmitted on the primary channel.

More specifically, the PPDU format transmitted in the BRP setup subphase can be transmitted in a duplicated mode via each of channels to be used for channel bonding, channel aggregation, and FDMA transmission. Since STAs intending to perform channel bonding, channel aggregation, and FDMA transmission perform beamforming on the primary channel only (or obtain the best sector ID only for the primary channel), the STAs can stably decode packets transmitted and received through the primary channel Hence, as shown in FIGS. 15 and 16, if a PPDU is transmitted in the duplicated mode, although decoding is performed on a single channel only, it may be able to receive information on a different channel used for performing channel bonding, channel aggregation, and FDMA transmission.

A PPDU format shown in FIG. 15 corresponds to a legacy control PHY PPDU format and the PPDU format can indicate information on a channel (or bandwidth) via a legacy header or an additionally appended control trailer. A PPDU format shown in FIG. 16 corresponds to a control PHY PPDU format using 1 lay format and the PPDU format can indicate information on a channel (or bandwidth) via a legacy header, an additionally appended control trailer, or EDMG header A.

FIGS. 17 and 18 are diagrams illustrating a PPDU format transmitted in a BRP setup subphase according to a different example applicable to the present invention.

Unlike the cases of FIGS. 15 and 16, an initiator and a responder can transmit and receive a BRP frame via a channel on which beamforming is performed only rather than the duplicated mode. In other word, as shown in FIGS. 17 and 18, a signal can be transmitted and received in a form of a PPDU format transmitted on a primary channel on which beamforming is performed only. In this case, transmitted BRP packet includes information on other channels to be used for transmitting channel bonding, channel aggregation, FDMA transmission, and the like.

A PPDU format shown in FIG. 17 corresponds to a legacy control PHY PPDU format and the PPDU format can indicate information on a channel (or bandwidth) via a legacy header or an additionally appended control trailer. A PPDU format shown in FIG. 18 corresponds to a control PHY PPDU format using 11ay format and the PPDU format can indicate information on a channel (or bandwidth) via a legacy header, an additionally appended control trailer, or EDMG header A.

3.1.2 MIDC Subphase

In the present invention, the MIDC subphase can be selectively applied.

An initiator and a responder can perform the beamforming methods (e.g., I-MID, R-MID, etc.) negotiated in the BRP setup subphase in the MIDC subphase. Although FIG. 14 shows a configuration that the initiator performs the I-MID only, the responder according to the present invention can perform the R-MID via the MIDC subphase.

In the MIDC subphase, the initiator and the responder can transmit and receive a BRP frame including an AGC field and a TRN (e.g., TRN-R) field in the whole band to perform wideband beamforming training. By doing so, the initiator and the responder can perform beamforming trial between small sets of a sector (e.g., TX sector) based on an SLS result and an AWV configuration (e.g., RX AWV configuration) via a primary channel of a system.

Figure 19:
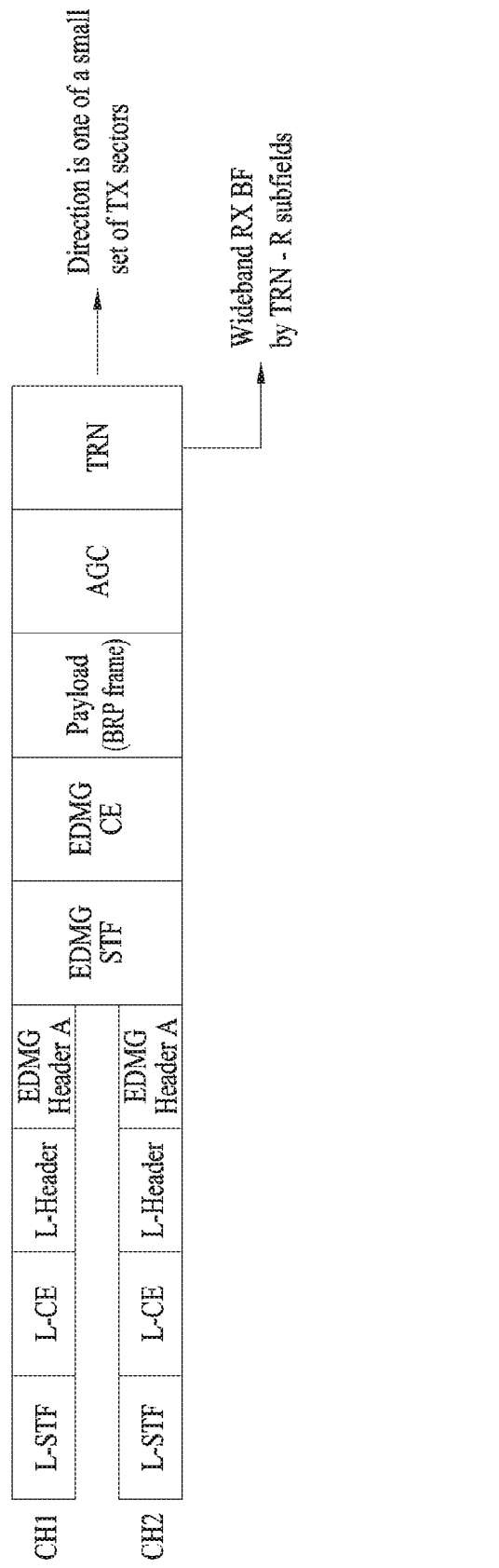
FIG. 19 is a diagram illustrating a PPDU format transmitted in an MIDC subphase according to an example applicable to the present invention.

FIG. 19 is a diagram illustrating a PPDU format transmitted in an MIDC subphase according to an example applicable to the present invention.

As shown in FIG. 19, a PPDU format (e.g., BRP packet) transmitted in the MIDC subphase may apply an EDMG PPDU format including an AGC field and/or a TRN field.

Figure 20:
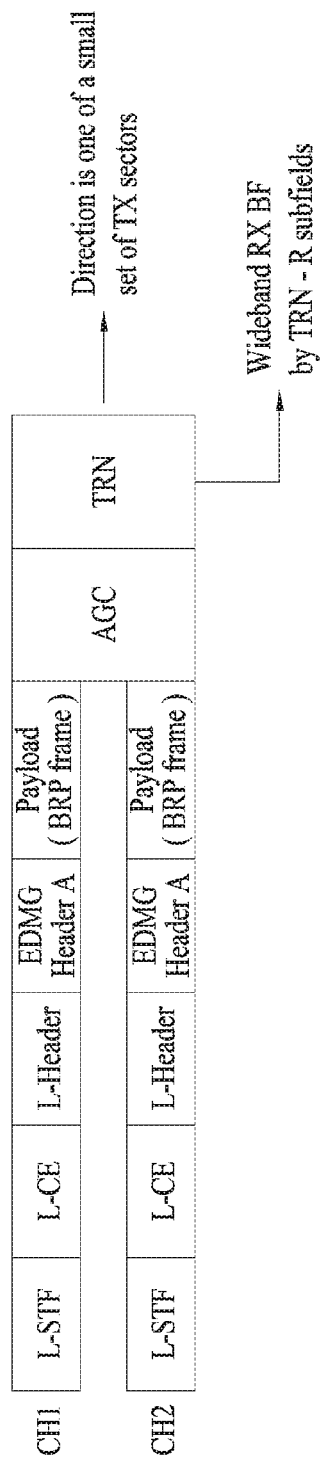
FIG. 20 is a diagram illustrating a PPDU format transmitted in an MIDC subphase according to a different example applicable to the present invention.

FIG. 20 is a diagram illustrating a PPDU format transmitted in an MIDC subphase according to a different example applicable to the present invention.

As shown in FIG. 20, a PPDU format transmitted in the MIDC subphase may not include an EDMG STF field and an EDMG CE field compared to the PPDU format shown in FIG. 19. The PPDU format can reduce signal overhead in the MIDC subphase.

Among the PPDU format shown in FIG. 19 or FIG. 20, since up to payload, which are transmitted before wideband BF training is performed, are transmitted by duplication according to a channel, although the PPDU format is transmitted in a sector ID direction, which is obtained in the SLS performed via a primary channel, it may be able to maintain a channel property as it is. Subsequently, AGC and TRN fields can be used for wideband beamforming training via a wideband channel. In other word, transmission can be performed in a direction among the PPDU format and the small set of the TX sectors and wideband RX beamforming can be performed via a TRN-R subfield.

Or, the PPDU format transmitted in the MIDC subphase can include a BRP frame only without a TRN field. In this case, a PPDU format including the EDMG header-A field can be utilized for the wideband beamforming training only.

In this case, information on a BW of an AGC field and/or a TRN field within the PPDU format can be transmitted via an L-header field or an EDMG header-A field included in the PPDU format. In particular, the information on the BW can indicate a case of performing channel bonding transmission and a case of performing channel aggregation transmission, respectively. Or, the information on the BW of the AGC field and the TRN field included in the PPDU format can also be signaled via the BRP setup subphase.

In particular, the PPDU format used in the MIDC subphase can be utilized for wideband beamforming training according to the present invention. Or, since it may fail to know a channel state of a wideband, up to a BRP frame can be transmitted in the duplicated mode.

According to the present invention, an initiator and a responder can transmit and receive the aforementioned various PPDU formats using control PHY where MCS corresponds to 0. The PPDU format can be transmitted in a manner that AGC and TRN fields for all channels used for channel bonding are appended or in a manner that the AGC and TRN fields for each channel used for channel aggregation are appended according to a channel. In particular, the initiator and the responder can perform beamforming on the channel bonding or the channel aggregation using the AGC and the TRN fields. In this case, since the PPDU format is transmitted by MCS 0, up to the payload of the PPDU format can be transmitted in the duplicated mode.

3.1.3 BRP Transaction Subphase

An initiator and a responder can perform wideband beamforming by transmitting and receiving a BRP frame during a BRP transaction subphase. In this case, the initiator and the responder can perform wideband TX and/or RX beamforming training by transmitting and receiving a single BRP frame. In this case, the BRP frame transmitted during the BRP transaction subphase can include an AGC field, a TRN-T field and/or a TRN-R field.

In order to more stably transmit and receive a BRP frame in the BRP transaction subphase, the initiator and the responder can transmit and receive the BRP frame using control PHY where MCS corresponds to 0. The PPDU format can be transmitted in a manner that the AGC and TRN fields for all channels used for channel bonding are appended or in a manner that the AGC and TRN fields for each channel used for channel aggregation are appended according to a channel. In particular, the initiator and the responder can perform beamforming on the channel bonding or the channel aggregation using the AGC and the TRN fields. In this case, since the PPDU format is transmitted by MCS 0, up to the payload of the PPDU format can be transmitted in the duplicated mode.

Figure 21:
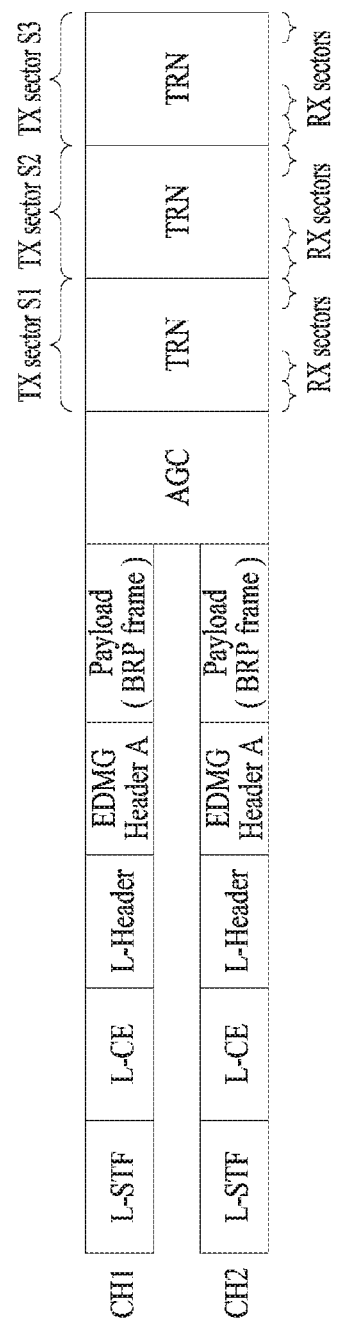

FIGS. 21 to 23 are diagrams illustrating a PPDU format transmitted in a BRP transaction subphase according to an example applicable to the present invention.

First of all, a PPDU format shown in FIG. 21 does not include an EDMG STF field and an EDMG CE field compared to a PPDU format shown in FIG. 22 and can be transmitted by MCS 0.

Or, as shown in FIG. 22, a PPDU format (e.g., BRP packet) transmitted in a BRP transaction subphase may apply an EDMG PPDU format including an AGC field and/or a TRN-T and/or a TRN-R field.

Or, in order to perform a beamforming training procedure for channel aggregation transmission, it may use a PPDU format shown in FIG. 23. In this case, the PPDU format can also be used for a beamforming training procedure for FDMA transmission. In this case, such a bandwidth as 1CH/2CH/3CH/4CH can be applied according to a frequency resource allocated by an STA that receives the FDMA transmission.

The aforementioned various PPDU formats can be identically used in a beam tracking phase described in the following. In this case, the PPDU format can identically support both singling for channel bonding transmission and signaling for channel aggregation transmission.

Additionally, the PPDU format can be transmitted using MCS 1 depending on an embodiment.

The initiator and the responder according to the present invention can transmit a BRP frame in a different form according to whether or not beamforming training is performed on channel bonding prior to the BRP transaction subphase.

Figure 24:
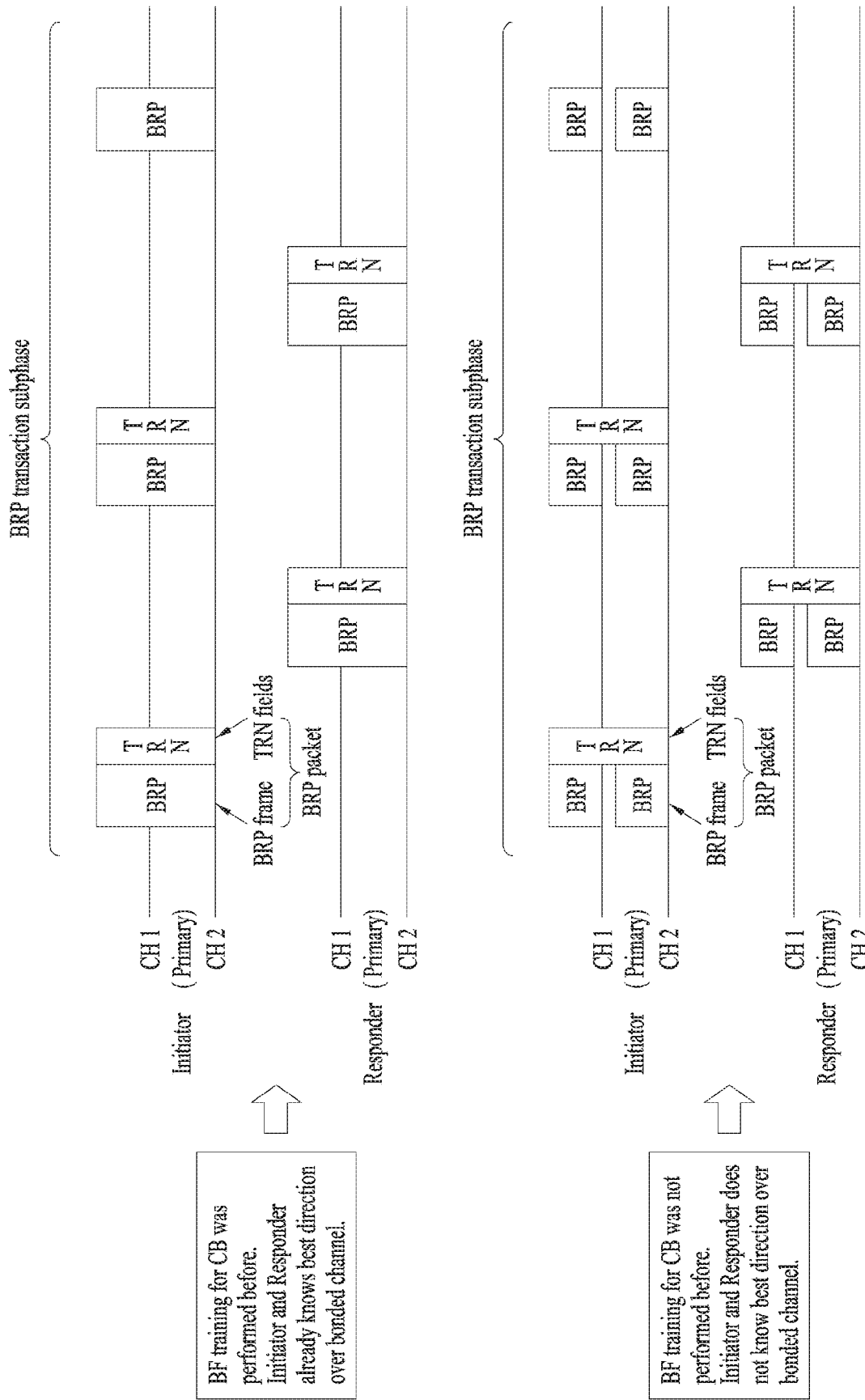
FIG. 24 is a diagram illustrating a configuration of transmitting a BRP packet according to an example of the present invention.

FIG. 24 is a diagram illustrating a configuration of transmitting a BRP packet according to an example of the present invention.

As shown in the upper drawing of FIG. 24, if beamforming training is performed on channel bonding prior to the BRP transaction subphase, an initiator and a responder can transmit a BRP frame, a TRN field, and the like through the total bonded channels. This is because the initiator and the responder know a best beam direction of the total bonded channels.

In other word, if beamforming for channel bonding or channel aggregation is performed prior to the BRP transaction subphase (and/or the MIDC subphase) and a result of the beamforming is valid, the initiator and the responder can transmit the PPDU format shown in FIG. 22 using a channel bonding scheme from a first BRP packet transmission irrespective of MCS.

Or, as shown in the bottom drawing of FIG. 24, if beamforming training is not performed on channel bonding prior to the BRP transaction subphase, the initiator and the responder transmit a BRP frame in a duplicated mode according to a channel and can transmit a TRN field through the total bonded channels. This is because the initiator and the responder do not know a best beam direction of the total bonded channels.

In other word, if beamforming for channel bonding or channel aggregation is not performed prior to the BRP transaction subphase (and/or the MIDC subphase) or a result, if the beamforming is performed, of the beamforming is invalid, the initiator and the responder can transmit the PPDU format shown in FIG. 21 using a channel bonding scheme or a separate channel aggregation scheme from a first BRP packet transmission by applying an MCS level 0 corresponding to the lowest MCS.

According to the abovementioned transmission scheme, a channel bonding PPDU format should be available as a PPDU format transmitted by the MCS 0. In this case, both the channel bonding PPDU format and a duplicated mode PPDU format should be available irrespective of the MCS.

Additionally, the PPDU format shown in FIG. 21 can be transmitted in the duplicated mode on the BRP transaction subphase (and/or the MIDC subphase).

In this case, information on a BW of an AGC field and/or a TRN field within the PPDU format can be transmitted via an L-header field or an EDMG header-A field included in the PPDU format.

For example, the information on the BW of the TRN field can be transmitted through the EDMG header-A field. Hence, it may be able to differently configure a TRN structure.

In this case, the information on the BW can be indicated via a 'scrambler initialization' subfield of the L-header field or a 'TRN bandwidth' subfield or a duplication mode field of the EDMG header-A field. Or, the information on the BW can be indicated via a reserved bit of a BRP frame or a newly defined element.

In this case, it may signal the information via the duplication mode field of 1-bit long included in the EDMG header-A field as follows.

If duplicate mode corresponds to 0, indications related to a bandwidth (e.g., an aggregation field and a bandwidth field) indicate a bandwidth structure for payload.

If duplicate mode corresponds to 1, it indicates that up to payload of a PPDU format is transmitted in a manner of being duplicated. Indications related to a bandwidth may indicate BW structures of AGC and TRN.

TABLE 2

| Field name | Bits |
|---|---|
| Duplicate mode(name is T. B. D) | 1 bit |
| Aggregation | 1 bits |
| bandwidth | 8 bits |

In addition, signaling on bandwidths of the AGC field and the TRN field can be indicated through a BRP frame which is transmitted immediately before the signaling or BRP setup subphase.

In particular, according to the present invention, a PPDU format used in the BRP transaction subphase can be utilized for wideband beamforming training. Or, since it may fail to know a channel state of a wideband, up to BRP frame can be transmitted in the duplicated mode.

According to the beamforming training procedure of the present invention, an initiator and a responder can sequentially perform the SLS phase, the BRP setup subphase, the MIDC subphase (optional), and the BRP transaction subphase.

In this case, when the MIDC subphase (or new beamforming training phase for 11ay) is performed, I-MID can be performed prior to R-MID and I-BC can be performed prior to R-BC. Or, when the MIDC subphase is performed, I-MID can be performed only without R-MID and I-BC can be performed only without R-BC. This is because, since an STA intending to transmit data (using channel bonding or channel aggregation) becomes an initiator, the initiator wants to perform TX beamforming training only and the responder wants to perform RX beamforming training only. In particular, if a partial training operation is performed only, an unnecessary beamforming training operation can be omitted.

And, the aforementioned beamforming training operation can be utilized not only for wideband beamforming training but also for beamforming training performed on SU-MIMO and MU-MIMO.

3.1.4 Beam Tracking Phase

Additionally, when an initiator and a responder practically transmit and receive data, the initiator and the responder can perform beamforming through a beam tracking phase. In particular, the beam tracking phase can be performed in a manner of being distinguished from the aforementioned BRP phase.

Figure 25:
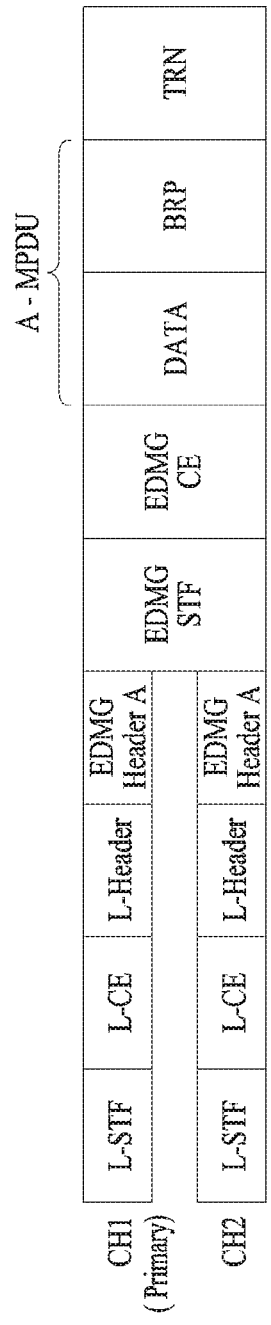
FIG. 25 is a diagram illustrating a PPDU format transmitted in a beam tracking step according to an example applicable to the present invention.

FIG. 25 is a diagram illustrating a PPDU format transmitted in a beam tracking step according to an example applicable to the present invention.

As shown in FIG. 25, a PPDU format transmitted in the beam tracking phase can include a data field and a BRP frame. In particular, if the BRP frame is transmitted in a manner of being attached to the data field, a bandwidth structure of the BRP frame can be identical to a bandwidth structure of the data field. And, a bandwidth structure of a TRN field can be configured to be identical to or different from the bandwidth structure of the BRP frame depending on a purpose of beam tracking. In this case, the characteristics can be determined via a request and response procedures.

For example, if data is transmitted using a channel bonding scheme but beam tracking is necessary for one channel only, if a subsequent signal transmission scheme corresponds to a transmission using a single channel, or if a beam link of a primary channel of a system becomes weak, the TRN field of the PPDU format shown in FIG. 25 can be transmitted (or attached) on the single channel only. Or, the TRN field of the PPDU format shown in FIG. 25 can be transmitted (or attached) in a form of channel aggregation for two channels.

In the following, a beamforming training method between an initiator and a responder is explained as an example based on the aforementioned configurations of the present invention.

The initiator and the responder can perform a beamforming training procedure to transceive a signal with each other via a plurality of channels. In this case, both the initiator and the responder may correspond to an STA transmitting or receiving a signal or data. In the following, for clarity, assume that the initiator corresponds to an STA intending to transmit a signal or data and the responder corresponds to an STA intending to receive a signal or data.

The initiator performs beamforming training on the plurality of channels before a signal is transmitted to the responder through the plurality of channels. To this end, the initiator transmits a BRP (beam refinement protocol) packet to the responder by applying a lowest MCS (modulation and coding scheme) (i.e., MCS level 0) to the BRP packet.

Subsequently, the initiator transmits a signal or data to the responder through the plurality of channels based on a result of the previously performed beamforming training.

The responder performs beamforming training by receiving the BRP packet from the initiator and can receive a signal or data from the initiator through the plurality of channels based on a result of the beamforming training.

In this case, the BRP packet can be configured in an order of an L-STF (Legacy Shot Training Field), an L-CE (Legacy Channel Estimation) field, an L-Header (Legacy Header) field, an EDMG Header A (Enhanced Directional Multi Gigabit Header A) field, a BRP (Beam Refinement Protocol) frame, and a TRN (Training) field. In particular, the BRP packet may not include an EDMG-STF, an EDMG-CE field, and an EDMG Header-B field.

For example, if the signal transmission method through the plurality of channels corresponds to channel bonding, the channel bonding can include channel bonding of 2 to 4 channels. As a different example, if the signal transmission method through the plurality of channels corresponds to channel aggregation, the channel aggregation can include channel aggregation of 2 channels or channel aggregation of 4 channels.

In this case, the EDMG header A field is transmitted in a manner of being duplicated by each channel included in the plurality of channels and the TRN field can be transmitted by a channel bonding transmission scheme or a channel aggregation transmission scheme according to information indicated by the header A field.

4. Device Configuration

Figure 26:
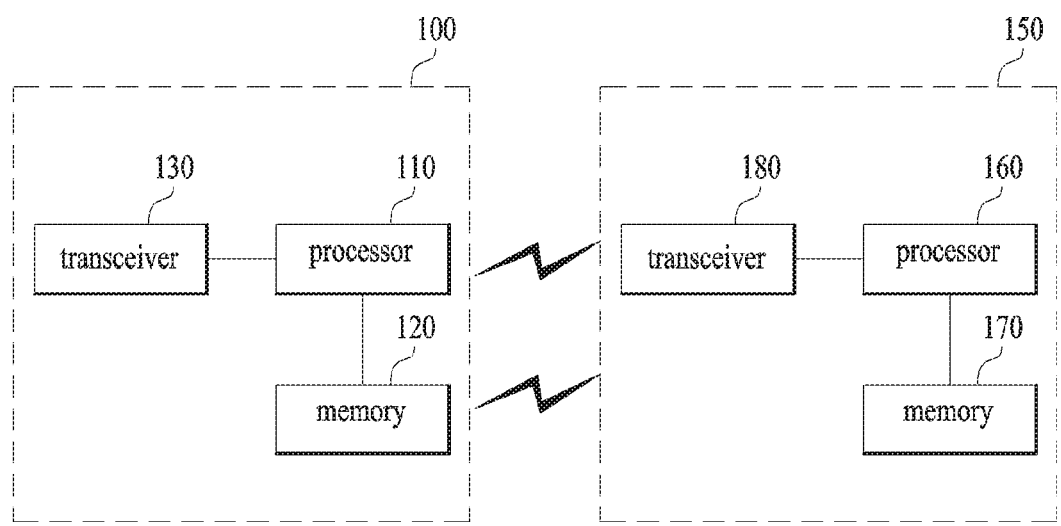
FIG. 26 is a diagram for explaining a device for implementing the aforementioned method.

FIG. 26 is a diagram for explaining a device for implementing the aforementioned method.

A wireless device 100 shown in FIG. 26 corresponds to the initiator STA configured to transmit a signal and a wireless device 150 may correspond to the responder STA configured to receive a signal. In this case, each of the STAs may correspond to 11ay terminal or PCP/AP. In the following, for clarity, the initiator STA configured to transmit a signal is referred to as a transmitting device 100 and the responder STA configured to receive a signal is referred to as a receiving device 150.

The transmitting device 100 includes a processor 110, a memory 120, and a transceiver 130 and the receiving device 150 can include a processor 160, a memory 170, and a transceiver 180. The transceiver 130/180 transmits/receives a radio signal and can be implemented in physical layer such as IEEE 802.11/3GPP. The processor 110/160 is executed in physical layer and/or MAC layer and is connected with the transceiver 130/180.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120,170 and executed by the processor 110,160. The memory 120, 170 may be located inside or outside the processor 110, 160 and may be connected to the processor 110, 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

The present invention has been explained under the assumption that the present invention is applied to IEEE 802.11 based wireless LAN system, by which the present invention may be non-limited. The present invention can be applied to various wireless systems capable of transmitting data based on channel bonding using the same scheme.

What is claimed is:

1. A method performed by a first station (STA) in a wireless LAN (WLAN) system, the method comprising:
   transmitting a beam refinement protocol (BRP) packet to a second STA through a plurality of channels, wherein the BRP packet is generated based on a lowest modulation and coding scheme (MCS), and wherein the plurality of channels is generated based on a channel bonding scheme or a channel aggregation scheme; and
   performing a beamforming training procedure on the plurality of channels for the second STA based on the BRP packet,
   wherein the BRP packet includes an Enhanced Directional Multi Gigabit Header A (EDMG Header A) field, a Beam Refinement Protocol (BRP) data frame, and a Training (TRN) field,
   wherein the BRP data frame is duplicated for the plurality of channels, and
   wherein the TRN field is transmitted through bonded channels generated based on the channel bonding scheme according to information in the EDMG Header A field.

2. The method of claim 1, wherein the BRP packet is configured in an order of a Legacy Short Training Field (L-STF) field, a Legacy Channel Estimation (L-CE) field, a Legacy Header (L-Header) field, the EDMG Header A field, the BRP data frame, and the TRN field.

3. The method of claim 1, wherein when the BRP packet is transmitted through the plurality of channels based on the channel bonding scheme, the plurality of channels comprises a channel bonding of 2 to 4 channels.

4. The method of claim 1, wherein when the BRP packet is transmitted through the plurality of channels based on the channel aggregation scheme, the plurality of channels comprises a channel aggregation of 2 channels or a channel aggregation of 4 channels.

5. The method of claim 1, wherein the BRP packet does not comprise an EDMG-STF field, an EDMG-CE field, and an EDMG header-B field.

6. The method of claim 1, wherein the lowest MCS corresponds to an MCS level 0.

7. A method performed by a second station (STA) in a wireless LAN (WLAN) system, the method comprising:
   receiving a beam refinement protocol (BRP) packet from a first STA through a plurality of channels, wherein the BRP packet is generated based on a lowest modulation and coding scheme (MCS), and wherein the plurality of channels is generated based on a channel bonding scheme or a channel aggregation scheme; and
   performing a beamforming training procedure on the plurality of channels for first STA based on the BRP packet,
   wherein the BRP packet includes an Enhanced Directional Multi Gigabit Header A (EDMG Header A) field, a Beam Refinement Protocol (BRP) data frame, and a Training (TRN) field,
   wherein the BRP data frame is duplicated for the plurality of channels, and
   wherein the TRN field is transmitted through bonded channels generated based on the channel bonding scheme according to information in the EDMG Header A field.

8. The method of claim 7, wherein the BRP packet is configured in an order of a Legacy Short Training Field (L-STF) field, a Legacy Channel Estimation (L-CE) field, a Legacy Header (L-Header) field, the EDMG Header A field, the BRP data frame, and the TRN field.

9. The method of claim 7, wherein when the BRP packet is transmitted through the plurality of channels based on the channel bonding scheme, the plurality of channels comprises a channel bonding of 2 to 4 channels.

10. The method of claim 7, wherein when the BRP packet is transmitted through the plurality of channels based on the channel aggregation scheme, the plurality of channels comprises a channel aggregation of 2 channels or a channel aggregation of 4 channels.

11. The method of claim 7, wherein the BRP packet does not comprise an EDMG-STF field, an EDMG-CE field, and an EDMG header-B field.

12. The method of claim 7, wherein the lowest MCS corresponds to an MCS level 0.

13. A first station in a wireless LAN (WLAN) system, the first station comprising:
   a transceiver configured to have one or more radio frequency (RF) chains and to transmit and receive a signal to and from a second station; and
   a processor configured to be connected to the transceiver and to process the signal transmitted to and received from the second station,
   wherein the transceiver is configured to transmit a beam refinement protocol (BRP) packet to a second station through a plurality of channels,
   wherein the BRP packet is generated based on a lowest modulation and coding scheme (MCS), and
   wherein the plurality of channels is generated based on a channel bonding scheme or a channel aggregation scheme, and
   wherein the processor is further configured to perform a beamforming training procedure on the plurality of channels for the second station based on the BRP packet,
   wherein the BRP packet includes an Enhanced Directional Multi Gigabit Header A (EDMG Header A) field, a Beam Refinement Protocol (BRP) data frame, and a Training (TRN) field,
   wherein the BRP data frame is duplicated for the plurality of channels, and wherein the TRN field is transmitted through bonded channels generated based on the channel bonding scheme according to information in the EDMG Header A field.

14. The method of claim 13, wherein the BRP packet is configured in an order of a Legacy Short Training Field (L-STF) field, a Legacy Channel Estimation (L-CE) field, a Legacy Header (L-Header) field, the EDMG Header A field, the BRP data frame, and the TRN field.

15. A second station in a wireless LAN (WLAN) system, the second station comprising:
- a transceiver configured to have one or more radio frequency (RF) chains and to transmit and receive a signal to and from a first station; and
- a processor configured to be connected to the transceiver and to process the signal transmitted to and received from the first station,
- wherein the transceiver is configured to receive a beam refinement protocol (BRP) packet from a first station through a plurality of channels, wherein the BRP packet is generated based on a lowest modulation and coding scheme (MCS), and wherein the plurality of channels is generated based on a channel bonding scheme or a channel aggregation scheme, and
- wherein the processor is further configured to perform a beamforming training procedure on the plurality of channels for the first station based on the BRP packet,
- wherein the BRP packet includes an Enhanced Directional Multi Gigabit Header A (EDMG Header A) field, a Beam Refinement Protocol (BRP) data frame, and a Training (TRN) field,
- wherein the BRP data frame is duplicated for the plurality of channels, and
- wherein the TRN field is transmitted through bonded channels generated based on the channel bonding scheme according to information in the EDMG Header A field.

16. The method of claim 15, wherein the BRP packet is configured in an order of a Legacy Short Training Field (L-STF) field, a Legacy Channel Estimation (L-CE) field, a Legacy Header (L-Header) field, the EDMG Header A field, the BRP data frame, and the TRN field.

* * * * *